United States Patent [19]

Lemmers

[11] Patent Number: 4,654,774

[45] Date of Patent: Mar. 31, 1987

[54] LOW RIPPLE, HIGH POWER FACTOR A-C TO D-C POWER SUPPLY

[75] Inventor: Eugene Lemmers, Cleveland Heights, Ohio

[73] Assignee: General Electric Company, Schenectady, N.Y.

[21] Appl. No.: 799,193

[22] Filed: Nov. 18, 1985

Related U.S. Application Data

[63] Continuation of Ser. No. 652,945, Sep. 21, 1984.

[51] Int. Cl.[4] .............. H02M 1/14

[52] U.S. Cl. .............. 363/48; 315/265; 315/283; 363/61; 363/126

[58] Field of Search .............. 307/146; 315/253, 265, 315/272, 283, 352; 363/44, 45, 47, 48, 60, 61, 101, 125, 126

[56] References Cited

U.S. PATENT DOCUMENTS

| | | | |
|---|---|---|---|
| 2,524,220 | 10/1950 | Elmlund et al. | 363/82 |
| 3,096,464 | 7/1963 | Lemmers | 315/189 |
| 3,233,148 | 2/1966 | Lake | 315/200 |
| 3,787,751 | 1/1974 | Farrow | 315/283 |
| 4,045,708 | 8/1977 | Neal | 315/283 |
| 4,092,564 | 5/1978 | Soileau | 315/208 |
| 4,222,096 | 9/1980 | Capewall | 363/44 |

FOREIGN PATENT DOCUMENTS

| | | | |
|---|---|---|---|
| 1934980 | 1/1971 | Fed. Rep. of Germany | 363/126 |

OTHER PUBLICATIONS

Lake, "Voltage Doubler Current Regulating Power Supply for Operation of Discharge Lamps", General Electric Report #437-178.

*Primary Examiner*—Patrick R. Salce
*Assistant Examiner*—Jeffrey Sterrett
*Attorney, Agent, or Firm*—Nathan D. Herkamp; Philip L. Schlamp; Fred Jacob

[57] ABSTRACT

A direct-current power supply circuit for gas discharge lamps includes a rectifier-capacitor bridge having a pair of input terminals and a pair of output terminals. A series input inductor is connected to one of the input terminals of the rectifier-capacitor bridge, and a pair of feedback diodes is connected to the output terminals of the rectifier bridge to provide a feedback signal to the series input inductor to control ripple of d-c output from said bridge and power factor of the a-c input to said bridge.

5 Claims, 1 Drawing Figure

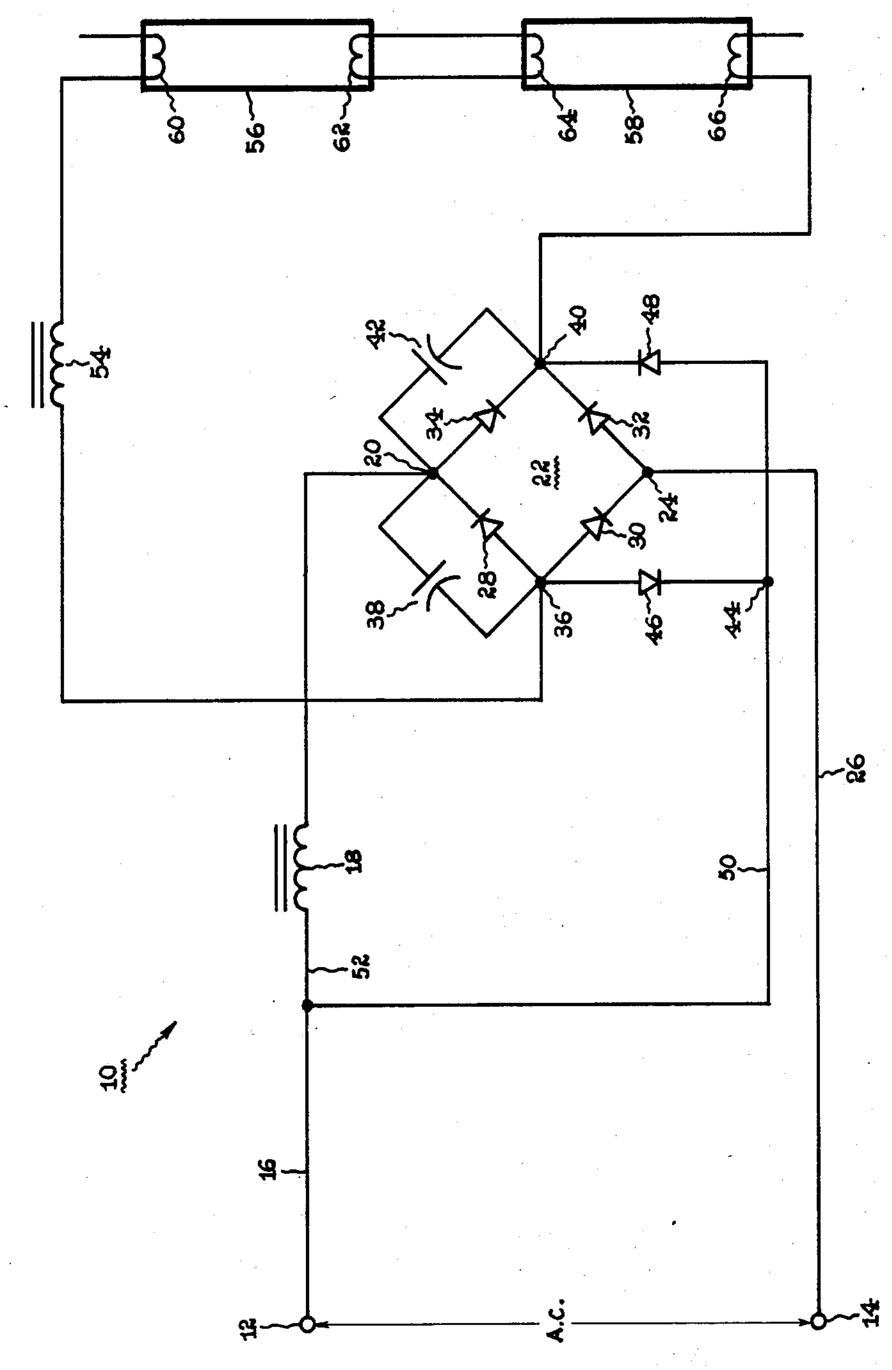
60
56
62
64
58
66
54
42
40
48
34
32
20
22
24
30
28
38
36
46
44
26
18
50
52
10
16
12
A.C.
14

LOW RIPPLE, HIGH POWER FACTOR A-C TO D-C POWER SUPPLY

This application is a continuation of application Ser. No. 652,945, filed 9/21/84, now abandoned, which is a continuation-in-part of application Ser. No. 567,705, filed Jan. 3, 1984 now abandoned.

BACKGROUND OF THE INVENTION

1. Field of the Invention

This invention relates to d-c power supply circuits, and, more particularly, to a circuit for supplying d-c power to a load such as gas discharge lamps.

2. Description of the Prior Art

The operation of tubular fluorescent lamps on direct current is known to improve efficiency in terms of lumens of light output per watt input. This is primarily due to the fact that the low pressure mercury discharge is more efficient with d-c operation in producing resonant radiation with lower current density, when the mercury vapor pressure is in the conventionally used range. However, the efficiency of d-c operation and efficacy in lumens per watt (LPW) when the lamp is operated on d-c current can be affected by the power-factor and ripple factor of unidirectional- current. It has been observed that operating with a power factor in the range of .9 and 1.0 and the ripple factor as low as possible are most desirable for efficient d-c operation.

For d-c operation large inductors were required to minimize the ripple in the d-c output. However, with the larger inductors the losses in system efficiency increase. A discharge lamp ballasting circuit is described in U.S. Pat. No. 3,233,148, issued Feb. 1, 1966 to William H. Lake and assigned to the present assignee. This patent describes several circuit configurations in which inductive impedance elements are added to rectifier-capacitor bridge ballast circuits to achieve a bimodal impedance characteristic for the discharge lamp with a cycle of transitions occurring at twice the power line frequency. The system of the Lake patent provides a power factor typically in the 0.5 to 0.7 range. This power factor is responsible for a significant part of the overall system loss in efficiency. The circuits shown also produced a large ripple factor of 50% or greater.

SUMMARY OF THE INVENTION

An object of the present invention is to provide a low ripple, high power factor d-c power supply circuit. A more specific object of the present invention is to provide an improved rectifier-capacitor bridge-type d-c power supply circuit as a gas discharge lamp ballasting circuit.

Accordingly, the power supply circuit of the present invention includes a rectifier-capacitor bridge circuit connected to an a-c power supply source having a series-connected a-c current-limiting inductor in the power supply line connected to the a-c source with a feedback link connecting the bridge circuit output terminals to the input side of the a-c inductor for providing power factor correction and low ripple in the unidirectional output signals.

BRIEF DESCRIPTION OF THE DRAWING

Further objects and advantages of the invention together with its organization, method of operation and best mode contemplated may best be understood by reference to the following description taken in conjunction with the accompanying drawing, in which:

The single figure is a schematic circuit diagram illustrating a d-c power supply circuit in accordance with the present invention.

DESCRIPTION OF THE PREFERRED EMBODIMENTS

A d-c power supply circuit of the present invention is shown schematically in the Figure connected to an electrical load comprising a pair of series-connected low pressure mercury vapor discharge lamps. The term "direct current" is used in the present application to indicate unidirectional current including rectified alternating current having a ripple. The power supply circuit 10 includes terminals 12, 14 connected to an a-c power supply, such as a 60 Hertz, 120 volt power line. One input line 16 is connected to the terminal 12 and to one end of an inductor 18 which is connected at its opposite end to one terminal 20 of a bridge circuit 22 whose opposite input terminal 24 is connected to input terminal 14 via line 26. Diode bridge 22 comprises diodes 28, 30, 32 and 34 connected as shown. Connected in parallel with diode 28 between terminals 20 and 36 is capacitor 38, and connected between terminals 20 and 40 in parallel with diode 34 is capacitor 42. Connected from terminal 36 to terminal 44 is diode 46, and connected between terminals 40 and 44 is diode 48. Diodes 46, 48 provide feedback via line 50 to the input end 52 of the series inductor 18. The load connected across terminals 36 and 40 includes d-c inductor 54 connected in series with series-connected low pressure mercury vapor discharge lamps 56 and 58. Lamp 56 includes filaments 60 and 62 at the respective ends thereof. Lamp 58 includes filaments 64 and 66 at the respective ends thereof. A starting circuit of conventional design as described and claimed in U.S. Pat. 3,096,464, issued to the present applicant on July 2, 1963, assigned to the present assignee and incorporated herein by reference thereto, or other conventional starting circuit, may be connected to the filaments at the ends of the respective lamps to provide lamp starting power.

The d-c power supply circuit 10 of the present invention operates as follows: When current is supplied to the bridge 22, the voltage on capacitors 38 and 42 builds up to approximately twice the line voltage and a unidirectional current is applied to the load via output terminals 36, 40. During one half-cycle of the input wave, a unidirectional current flows via terminal 12 through a-c inductor 18, terminal 20, diode 34, terminal 40, lamps 58 and 56, d-c inductor 54, terminal 36, diode 30 and terminal 24 to terminal 14. During the other half-cycle of the input wave, a unidirectional current flows via terminal 14 through terminal 24, diode 32, terminal 40, lamps 58 and 56, d-c inductor 54, terminal 36, diode 28, terminal 20 and a-c inductor 18 to terminal 12. The voltage across the capacitors 38 and 42 and consequently the voltage across the lamps 56 and 58 is approximately twice the line voltage. A feedback tap at 44 at the junction of diodes 46 and 48 provides a feedback signal via diode 46 during one half-cycle of the input a-c signal and via diode 48 during the other half-cycle of the a-c input signal. The feedback signal to the a-c inductor 18 results in a significant reduction in the ripple of the unidirectional output current supplied at terminals 36 and 40, especially at higher current levels resulting from the use of smaller inductance values for inductors 18 and 54. The power supply circuit of the present invention produces a significantly improved power factor of the a-c input and a significantly reduced ripple factor of the d-c output wave compared to prior art power supply circuits.

In a specific example of the present invention, terminals 12 and 14 were connected to a 120 volt, 60 Hertz power line. An inductor 18 of about 0.335 henrys and about 4 ohms impedance was connected to one of said terminals. The bridge circuit was connected as shown in the Figure and comprised four diodes with capacitors 38 and 42 each of about 7.5 microfarads at a voltage rating of about 200 volts. A load was connected to output terminals 36 and 40 and comprised an inductor 54 of about 0.8 henrys and about 6.5 ohms impedance connected in series with a pair of series-connected fluorescent lamps of the four-foot, 34-watt low energy type (sold by the General Electric Company under the trademark WATT-MISER ® II), using a krypton and argon gas mixture with mercury vapor as the discharge gas. With the feedback connection shown in the Figure, the average overall system efficacy was in the range of 90–92 LPW with a ripple factor of the d-c output in the range of 5 to 10 percent of average current and a power factor of the a-c input of about 0.95 at an output in the range of 5000 to 6000 lumens per pair of lamps. Furthermore, the ballast efficiency, i.e., the ratio of watts output to watts input was about 96.2%. An experiment was performed to compare performance with the feedback connection of the present invention to that without the feedback connection. The component values of the above example were employed, except that the inductance value of a-c inductor 18 was varied. A value of 0.406 henries for inductor 18 resulted in a power factor of the a-c input signal of 0.9835 and a ripple factor of the d-c output of about 5% of the average current. A value of 0.246 henries for a-c inductor 18 resulted in a power factor of the a-c input signal of 0.901 and a ripple factor of the d-c output of about 10%. With the feedback connection removed the power factor dropped significantly. To obtain approximately the same wattage of the lamps, it was necessary to approximately halve the capacitance of the capacitors 38 and 42 and to increase the inductance value of a-c inductor to 0.8 henries. The ballast efficiency of the power supply circuit with the feedback connection was about 96%, while the ballast efficiency without the feedback was about 84%. Therefore, it will be apparent that using the d-c power supply circuit with the feedback connection of the present invention provides improved power factor correction and ripple factor correction without large inductances and their associated losses.

As shown by the above-described experiment, the d-c power supply circuit with the feedback connection as shown in the present invention allows adjustment of the power factor of the a-c input within the range of about 0.9 to about 1.00 and limiting of the ripple factor of the d-c output to within the range of 5 to 10 percent of average current by proper selection of inductance values for inductor 18 in the range of about 0.2 to about 0.5 henries. The size of inductor 54 may also be varied between about 0.4 and 0.8 henries to control ripple factor of the d-c output. As the example above shows, the size of both inductors 18 and 54 can be small, and therefore the losses contributed by the inductors can be limited by using the feedback connection of the present invention. The capacitance of capacitors 38 and 42 may preferably be in the range of 7.0 to 8.0 microfarads. The circuit interactions responsible for this result are not fully understood, but in several tests the results show consistently that smaller component values can be used while maintaining power factor of the input in the desired 0.9 to 1.0 range with reduced ripple in the output, thereby verifying the improvement achieved by the present invention.

The same circuit configuration can be employed to supply d-c power to other types of lamps, for example, a d-c power supply circuit with approximately the same component values has been successfully used with 8-foot standard 40-watt fluorescent lamps. Also, the same circuit with appropriately selected component values can be used with a 277 volt a-c power supply. Therefore, it will be readily seen that the present invention provides an improved ballasting circuit for providing d-c power to loads such as low pressure mercury vapor discharge lamps.

What I clai:m as new and desire to secure by Letters Patent of the United States is:

1. An a-c to d-c power supply circuit for supplying d-c electrical power to a load comprising:

a pair of input terminal means for receiving a-c input power;

input a-c inductor means connected to one of said pair of input terminal means for receiving said a-c input power;

rectifier-capacitor bridge circuit means for converting said a-c input power to d-c output power; said bridge circuit means comprising a pair of bridge input terminal means for receiving a-c input power and for connection to respective ones of said input terminal means, bridge rectifier means, and a pair of direct current bridge output terminal means for providing said d-c output power to an electrical load; and feedback connection means comprising a pair of diodes each having one terminal thereof connected to a respective one of said bridge output terminal means and having the other terminal thereof connected to the input side of said input a-c inductor means for providing a feedback signal to the input side of said input a-c inductor means during respective half-cycles of the a-c input power; whereby the power factor of the a-c input power is increased to the range of 0.9 to 1.0 and the ripple factor of said d-c output power is decreased to the range of 5 to 10 percent of the average d-c current.

2. The invention of claim 1:

further comprising load means connected to said output connection means comprising:

output d-c inductor mean connected to one of said bridge output terminal means; and a pair of low pressure mercury vapor discharge lamps connected in electrical series and having a first filament of one lamp disposed at one end of said one lamp connected electrically in series with said output d-c inductor means and a second filament of said one lamp disposed at the opposite end of said one lamp connected electrically in series with a first filament of the other of said lamps disposed at one end of said other of said lamps and a second filament of said other of sad lamps disposed at the opposite end of said other of said lamps connected to the other of said bridge output terminal means;

wherein said rectifier-capacitor bridge means comprises:

a diode bridge means for converting a-c power to d-c:power comprising:

first and second diodes connected to form one of said input terminal means;

third and fourth diodes connected to form the other of said input terminal means;

said first and third diodes being connected to form one of said output terminal means; and said second and fourth diodes being connected to form the other of said output terminal means; and first and second capacitors connected in electrical parallel, respectively, with said first and second diodes and comprising a voltage doubling means; and wherein said pair of diodes of said feedback connection means comprises:

a fifth diode having one terminal thereof connected to a first one of said output terminal means and having the other terminal thereof connected to said input side of said input a-c inductor means for providing a feedback signal to said input a-c inductor means during the time period of one half-cycle of the a-c input wave; and a sixth diode having one terminal thereof connected to the second one of said output terminal means and having the other terminal thereof connected to said input side of said input series inductor means for providing a feedback signal to said input a-c inductor means during the time period of the other half cycle of the a-c input wave.

3. The invention of claim 1 wherein said input a-c inductor means comprises:

an inductor having an inductance value in the range of about 0.2 to about 0.5 henries.

4. The invention of claim 1 wherein said output d-c inductor means comprises:

an inductor having an inductance value in the range of about 0.4 to about 0.8 henries.

5. The invention of claim 1 wherein each of said first and second capacitor means comprises:

a capacitor having a capacitance in the range of about 7.0 to about 8.0 microfarads.

* * * * *